United States Patent Office 3,455,712
Patented July 15, 1969

3,455,712
MASKING COMPOSITION
Arthur Webb, East Chicago, Ind.
(1211 Forest St., Mount Vernon, Ill. 62864)
No Drawing. Filed Dec. 28, 1965, Ser. No. 517,105
Int. Cl. C09k 3/00
U.S. Cl. 106—157                 11 Claims This invention relates to a masking composition. More particularly, this invention relates to a masking composition which is utilized in covering areas not to be covered with a coating composition such as a paint and has the attribute of being readily removed when desired by water.

It is conceded that the prior art is replete with various masking compositions which may be applied to a surface to protect the surface from paint and the like. Unfortunately, the prior art masking compositions require solvation either by an organic solvent or by a water solution containing a detergent. The instant composition has the unique attribute of being removed by applying water alone, inasmuch as the composition of the present invention contains the ingredients within itself for removal from a surface after it is no longer desired.

In other words, the present composition relates to a novel liquid composition for use in applying to surfaces adjacent to or near surfaces to be painted, in order to protect the surface from paint on which the composition is applied. When the composition has served its purpose, it can be removed from the surface to which it has been applied by the use of water alone. To reiterate, one of the tremendous improvements in the present invention is that it can be removed with water, eliminating the need for toxic and low ignition point solvents.

The present composition may be applied to any non-porous surface with a brush, spatula, or spray device. The composition readily adheres to the surface to which it is applied.

The composition may be applied to exposed human skin, such as hands and arms, to protect from paint. By including a surfactant or detergent in the composition, it is easy to remove the coating when the need therefor is no longer necessary.

Accordingly, it is a primary object of the present invention to set forth a masking composition which may be removed by water, as desired.

It is another object of the present invention to set forth a masking composition which may be readily applied to applicable surfaces.

Additional advantages and objects will become apparent from the detailed consideration of the present invention as set forth below.

The present invention contemplates a composition comprising a surfactant which may be either an ionic or a non-ionic detergent; however, preferably, the surfactant is of the anionic type. The surfactant is utilized in solution so that an aqueous system is employed, or the solvent for the detergent is a low carbon alcohol or naphtha or the like. Besides the surfactant, an oil is included in the present composition. Additionally, a hydrocarbon compound or mixtures thereof a higher range viscosity, such as petroleum jelly, is included. As a binder material to increase the viscosity, a starch, or dextrin is included.

A filler material, such as flour, clay, fuller's earth, kaolin, methyl cellulose, or paper pulp, may be included.

The materials of the present invention are formulated by mixing the liquid surfactant with the oil and petroleum jelly. After suitable mixing, the filler material and organic binder are admixed.

For a more detailed consideration of the present invention, the following examples are set forth; however, the ranges of the ingredients are not limited thereto.

EXAMPLE I

| | Pounds | Percent |
|---|---|---|
| Surface-active agent (A reaction product of 2 parts coconut oil fatty acid to 1 part diethanolamine) | 4.47 | 38.3 |
| Motor oil ASAE 10W-30 | 1.60 | 13.7 |
| Petroleum jelly | 0.74 | 6.3 |
| Starch | 0.86 | 7.3 |
| Flour | 4.01 | 34.4 |

The coconut oil fatty acid and diethanolamine are reacted together to form coconut oil fatty acid diethanolamine, which, in liquid form, is mixed with motor oil and petroleum jelly and heated while stirring to facilitate solvation. Once the ingredients have been mixed, the flour and starch are added to give a complete final mixture useful for the intended purpose.

EXAMPLE II

| | Pounds | Percent |
|---|---|---|
| Surfactant (50% sodium dodecylbenzene sulfonate +50% butanol) | 2.11 | 21.1 |
| Motor oil ASAE 10W-30 | 2.17 | 21.8 |
| Petroleum jelly | 0.81 | 8.1 |
| Starch | 0.98 | 9.8 |
| Flour | 3.90 | 39.2 |

The ingredients are mixed in the same manner as in Example I.

It will be appreciated that the ingredients set forth in the examples may be altered in their quantities to conform to specific requirements, such as faster drying, thicker coating, changing fluidity, and/or higher detergent action.

The quantity of surfactant may be increased by as much as 25% to increase the detergency action, the range then being 21.1 to 52.5% by weight or 2.11 to 5.6 parts by weight. An increase in surfactant would also increase fluidity for use of the composition in spray guns or the like. The quantity of motor oil may be also increased by as much as 25%, the range then being 13.7 to 27.2% by weight or 1.6 to 2.7 parts by weight. An increase in motor oil will also lower the detergency action, although it would increase the fluidity for use in spray guns or the like. Other grades of motor oil may be used, although the ASAE grade recommended in the above examples helps to maintain a fairly constant viscosity with temperature changes. Additionally, the quantity of petroleum jelly may be increased by as much as 25% to effect drying time, the range then being .74 to 1 part by weight. Increase of petroleum jelly will lower fluidity and detergency action. Additionally, light weight paraffin oil could be used in place of either motor oil or petroleum jelly, but it is not as efficient.

The quantity of flour and starch may be varied to increase or decrease the fluidity of the mixture as desired. The ratio of flour to starch has wide variation, such as from 6 parts flour to 1 part starch to zero parts flour to all starch. The greater the flour amount, the more grainy the mixture; whereas, the greater the amount of starch, the more separation of components.

The theory of the hydrocarbon and surfactant mixture is that the hydrocarbon will solvate the alkyl end of the surfactant molecule, permitting greater solvation ability with paint vehicles applied to them and at the same time furnishes an adherent quality to the surface applied. The hydrophilic end of the detergent causes solvation with water, allowing removal by this medium. The resultant hydrocarbon surfactant groups will be sufficiently large enough to solvate the similar ingredients in paint and not allow them to penetrate to the protected surface. The lower viscosity hydrocarbon allows for greater fluidity, particularly at lower temperatures, and the higher hydrocarbon seems to give a solidarity to the composition, allowing for greater adhesion to the protected surface.

Each of the ingredients of the present invention has a unique function and together produce a valuable desired result. The surfactant allows all the materials to be washed away by the use of water alone. The motor oil acts as a carrying medium for the other ingredients, so that it is in a brushable or sprayable condition. Additionally, the motor oil keeps the paint from penetrating to the protected surfaces. The petroleum jelly has a great influence on the drying time in direct proportion to the amount used. It keeps the mixture from having an objectionable watery or grainy consistency. Finally, the flour and starch give body to the mixture to keep solvents in the paint and the paint from penetrating to the protected surface.

While in the foregoing examples coconut oil fatty acid-diethanolamide and dodecylbenzene sulfonate have been set forth as the detergents, other surfactants may be employed either of the so-called hard detergent type or of the newer biodegradable type.

The utilization of starch and/or flour for the filler and organic binder has been found efficacious, due to the fact that this material is biodegradable, and consequently easily removed. It should be understood, however, that flour may act as both the binder and the filler, making it unnecessary to utilize any other filler or binder.

The organic solvent for the detergent in Example II has been indicated to be butanol. Other applicable solvents are water, propanol, naphtha, and similar solvents, including mixtures thereof. The solvent should be of a high enough boiling point so as to lower the evaporation rate and keep the material fluid for a longer period of time. The solvent should also be of a type that is compatible with water and hydrocarbon. Any of the solvents listed could be used in Example I, but is not necessary.

The composition of the present invention may be employed to mask from all paints, such as asphalt base, oil base, water base, latex base, lacquer, shellac, and varnish. The mixture can withstand relative extremes in temperature without destroying its effectiveness as a masking medium.

It will be apparent that many changes and modifications of the several features described herein may be made without departing from the spirit and scope of the invention. It is, therefore, apparent that the foregoing description is by way of illustrating the invention rather than limitation of the invention.

I claim:

1. A masking composition consisting essentially of: as a major proportion a mixture of (a) an oil selected from the group consisting of motor oil and paraffin oil and (b) a surface active agent, petroleum jelly and an organic binder which includes starch and a filler which includes flour.

2. The composition of claim 1, wherein the surface active agent is an anionic detergent.

3. The composition of claim 2, wherein the detergent is selected from the group consisting of sodium alkylaryl sulfonate and coconut oil fatty acid diethanolamide.

4. The composition of claim 1, wherein the organic binder is selected from the group consisting of starch and dextrin.

5. The composition of claim 1, wherein a solvent for the surface active agent is added.

6. The composition of claim 1, wherein a filler is included, said filler being selected from the group consisting of flour, clay, fuller's earth, powdered methyl cellulose, and paper pulp.

7. The composition of claim 5, wherein the solvent is selected from the group consisting of butanol, water, propanol, and naphtha.

8. The composition of claim 7, wherein the solvent is butanol.

9. A masking composition in accordance with claim 1, having the following parts by weight: 4.47 parts coconut oil fatty acid diethanolamide, 1.60 parts motor oil; 0.74 part of petroleum jelly, 0.86 part starch, and 4.01 parts by weight flour.

10. The composition of claim 1 wherein the oil is present in the amount between 13.7 to 27.2% by weight and the surface active agent is present in the amount of 21.1 to 52.5% by weight.

11. The composition of claim 1 having the following:

| | Parts by weight |
|---|---|
| Surface active agent | 2.11–5.6 |
| Motor oil | 1.6–2.7 |
| Petroleum jelly | .74–1.0 |
| Flour and starch. | |

References Cited

UNITED STATES PATENTS

| | | | |
|---|---|---|---|
| 2,540,678 | 2/1951 | Kelley | 106—273 |
| 2,655,923 | 10/1953 | Gallenkamp | 106—212 |
| 2,849,331 | 8/1958 | Turbolente | 117—5.5 |
| 2,371,933 | 3/1945 | Steinbock | 106—134 |
| 2,238,776 | 4/1941 | Kleinicke | 106—212 |

FOREIGN PATENTS 418,590    10/1934    Great Britain.

JULIUS FROME, Primary Examiner

T. MORRIS, Assistant Examiner

U.S. Cl. X.R.

106—211, 212, 214